United States Patent [19]

Kojima

[11] Patent Number: 4,793,600
[45] Date of Patent: Dec. 27, 1988

[54] VIBRATION ISOLATING APPARATUS

[75] Inventor: Hiroshi Kojima, Yokohama, Japan

[73] Assignee: Bridgestone Corporation, Tokyo, Japan

[21] Appl. No.: 23,796

[22] Filed: Mar. 9, 1987

[30] Foreign Application Priority Data

Mar. 14, 1986 [JP] Japan .................. 61-56705

[51] Int. Cl.$^4$ .................. F16F 13/00; B60K 5/12
[52] U.S. Cl. .................. 267/140.1; 188/322.13; 248/562; 248/636; 267/124
[58] Field of Search .......... 267/140.1, 141.35, 140.4, 267/141.2–141.7, 122, 123, 152, 153, 201, 205, 219, 64.11, 64.22, 64.21, 64.19, 64.23, 64.24; 188/298, 299, 319, 320, 322 B; 180/312, 291, 902; 248/562–566, 636, 637, 638

[56] References Cited

U.S. PATENT DOCUMENTS

| | | | |
|---|---|---|---|
| 3,159,388 | 12/1964 | Wall | 267/123 |
| 3,361,216 | 1/1968 | Walker | 188/298 X |
| 4,383,679 | 5/1983 | Kakimoto | 267/140.1 |
| 4,424,960 | 1/1984 | Dan et al. | 267/140.1 |
| 4,505,462 | 3/1985 | Dan et al. | 267/140.1 |
| 4,535,976 | 8/1985 | Dan et al. | 267/140.1 |
| 4,568,069 | 2/1986 | Poupard | 243/562 |
| 4,583,723 | 4/1986 | Ozawa | 248/562 |
| 4,595,183 | 6/1986 | Dan et al. | 267/140.1 |
| 4,610,421 | 9/1986 | Ohta et al. | 248/562 X |
| 4,630,806 | 12/1986 | Dan et al. | 267/140.1 |
| 4,630,808 | 12/1986 | Ushijima et al. | 267/140.1 |
| 4,635,910 | 1/1987 | Ozawa et al. | 248/562 X |
| 4,650,170 | 3/1987 | Fukushima | 248/562 X |
| 4,660,812 | 4/1987 | Dan et al. | 267/140.1 |
| 4,664,363 | 5/1987 | Gold et al. | 248/636 X |

FOREIGN PATENT DOCUMENTS

| | | |
|---|---|---|
| 0027751 | 4/1981 | European Pat. Off. . |
| 0040290 | 11/1981 | European Pat. Off. . |
| 0088682 | 9/1983 | European Pat. Off. . |
| 0133588 | 2/1985 | European Pat. Off. . |
| 0147242 | 7/1985 | European Pat. Off. . |
| 3210731 | 10/1983 | Fed. Rep. of Germany . |
| 3340153 | 8/1984 | Fed. Rep. of Germany . |
| 52-131072 | 11/1977 | Japan . |
| 53-117704 | 10/1978 | Japan . |
| 56-66539 | 6/1981 | Japan . |
| 57-76340 | 5/1982 | Japan . |
| 58-37337 | 3/1983 | Japan . |
| 59-47541 | 3/1984 | Japan . |
| 59-65635 | 4/1984 | Japan . |
| 59-97334 | 6/1984 | Japan . |
| 0113835 | 6/1985 | Japan .............. 267/140.1 |
| 60-179542 | 9/1985 | Japan . |
| 0002936 | 1/1986 | Japan .............. 267/140.1 |
| 0055427 | 3/1986 | Japan .............. 267/140.1 |
| 62-46041 | 2/1987 | Japan . |
| 2041485 | 9/1980 | United Kingdom . |
| 2132312 | 7/1984 | United Kingdom . |

Primary Examiner—Andres Kashnikow
Assistant Examiner—Matthew C. Graham
Attorney, Agent, or Firm—Parkhurst, Oliff & Berridge

[57] ABSTRACT

A vibration isolating apparatus has a pair of small liquid chambers which are communicated with each other through an orifice. A partition which divides the small liquid chambers is provided with a vibrating plate in order to suppress rise in liquid pressure within the small liquid chambers. When a vibration of extremely low frequency is input, a part of a flexible membrane which defines a part of the liquid chamber is pressed against the vibrating plate by the action of a restraining means to prevent vibration of the vibrating plate. Accordingly, the occurrence of resonance of the liquid within the orifice is ensured, and the vibration is thereby effectively absorbed.

20 Claims, 5 Drawing Sheets

VIBRATION ISOLATING APPARATUS

BACKGROUND OF THE INVENTION

1. Field of the Invention

The present invention relates to a vibration isolating apparatus which may be employed as an engine mount or the like to absorb vibrations.

2. Description of the Related Art

Among vibration isolating apparatuses employed as engine mounts or the like is one type of vibration isolating apparatus wherein a liquid chamber is divided by a partition into a plurality of small liquid chambers which are communicated through an orifice. In this type of vibration isolating apparatus. When a vibration occurs, a liquid is moved between the small liquid chambers through the orifice, whereby the vibration is absorbed by means of the fluid resistance of the liquid passing through the orifice.

In such a vibration isolating apparatus, when the frequency of vibrations becomes high, the orifice may be clogged or loaded with the liquid, and therefore it is preferable to provide a vibrating plate in order to absorb high-frequency vibrations by the vibration of this plate.

However, this vibrating plate undesirably prevents the occurrence of resonance of the liquid within the orifice at the time of generation of vibrations of extremely low frequency (20 to 30 Hz and very small amplitude (±0.1 to 0.4 mm) such as those generated during idling of the engine, and this limits lowering of the dynamic scale factor, disadvantageously.

SUMMARY OF THE INVENTION

In view of the above-described circumstances, it is a primary object of the present invention to provide a vibration isolating apparatus which can reliably lower the dynamic scale factor even at the time of generation of vibrations of extremely low frequency such as those generated during idling of the engine.

To this end, the present invention provides a vibration isolating apparatus which comprises a vibrating plate for absorbing high-frequency vibrations by means of the vibration thereof even when the orifice is clogged with the liquid because of such high-frequency vibrations, the vibrating plate being provided so as to face a plurality of small liquid chambers and adapted to be able to be fixed on the partition by the action of restraining means through a flexible membrane.

By virtue of the above-described arrangement of the present invention, when a vibration of extremely low frequency such as that generated during idling of an engine occurs, the vibrating plate is fixed in order to allow the liquid within the orifice to resonate easily. As a result, vibrations which are proper to the engine in an idling state can be absorbed by means of resonance of the liquid in the orifice, so that it is possible to reliably lower the dynamic scale factor during idling of the engine.

The above and other objects, features and advantages of the present invention will become more apparent from the following description of the preferred embodiments thereof taken in conjunction with the accompanying drawings.

DESCRIPTION OF THE PREFERRED EMBODIMENTS

Figure 1:
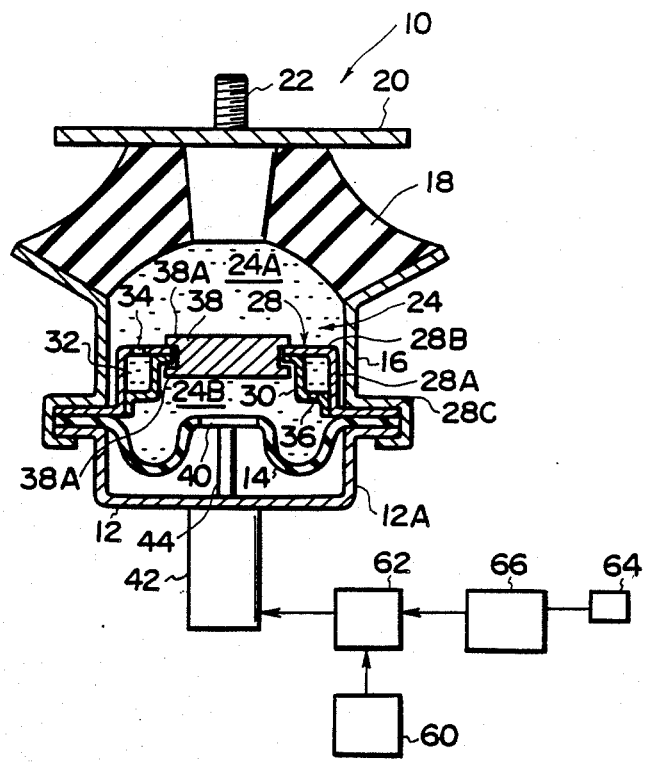
FIG. 1 is a sectional view of a first embodiment of the vibration isolating apparatus according to the present invention.

FIG. 1 shows a vibration isolating apparatus in accordance with a first embodiment of the present invention. In this apparatus 10, a vertical wall 12A is formed along the periphery of a base plate 12 which is rigidly secured to a body of an automobile. A diaphragm 14 and the lower end portion of an outer tube 16 are rigidly secured to the upper end portion of the vertical wall 12A. The space between the base plate 12 and the diaphragm 14 defines an air chamber which is communicated with the outside according to need. The outer tube 16 is disposed in such a manner that its axis extends vertically, and the outer periphery of a rubber member 18 which constitutes a vibration absorbing main body is bonded to the upper end portion of the outer tube 16 by means of vulcanization. A top plate 20 is bonded to the upper end portion of the rubber member 18 by means of vulcanization. A bolt 22 projects from the top plate 20 for the purpose of rigidly securing an engine which is mounted on the top plate 20.

The rubber member 18, the outer tube 16 and the diaphragm 14 define in combination a liquid chamber 24 which is filled with a liquid such as water or oil.

The liquid chamber 24 is divided by a partition 28 into upper and lower small liquid chambers 24A and 24B. The partition 28 has an integral structure which consists of a tubular portion 28A, a flat-plate portion 28B connected to the upper end of the tubular portion 28A, and a flange portion 28C connected to the lower end of the tubular portion 28A, the flange portion 28C being clamped between the outer tube 16 and the diaphragm 18. An abutment plate 30 is rigidly secured to the lower portion of the partition 28.

The upper end portion of the abutment plate 30 is rigidly secured to the undersurface of the flat-plate portion 28B, while the lower end portion of the plate 30 is rigidly secured to the lower portion of the inner periphery of the tubular portion 28A, and the portion of the abutment plate 30 between the upper and lower end portions thereof is formed so as to have a substantially L-shaped cross-section, thus defining an orifice 32 between said portion of the abutment plate 30 and the partition 28. The orifice 32 has a C-shaped planar configuration. One end of the C-shaped orifice 32 is communicated with the upper small liquid chamber 24A through a through hole 34 provided in the flatplate portion 28B, and the other end of the orifice 32 is communicated with the lower small liquid chamber 24B through a through-hole 36 provided in the abutment plate 30. Accordingly, the upper and lower small liquid chambers 24A and 24B are communicated with each other through the elongated orifice 32.

A vibrating plate 38 extends through the respective axial centers of the partition 28 and the abutment plate 30. The upper and lower end portions of the vibrating plate 38 are enlarged in diameter so as to provide enlarged-diameter portions 38A which are located within the upper and lower small liquid chambers 24A and 24B, respectively, the vibrating plate 38 being retained by the partition 28 through these enlarged-diameter portions 38A. The length of a portion of the vibrating plate 38 which is defined between the pair of upper and lower enlarged-diameter portions 38A is set so as to be larger than the total wall thickness of the partition 28 and the abutment plate 30, thus allowing the vibrating plate 38 to vibrate vertically by a very small amount.

Figure 2:
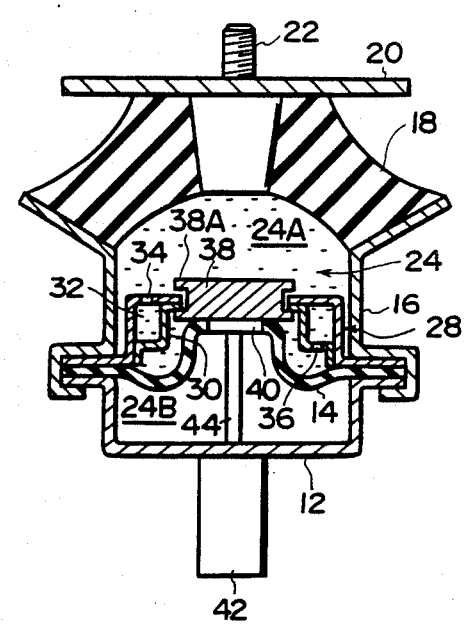
FIG. 2 is a view employed to describe the operation of the embodiment shown in FIG. 1.
Figure 3:
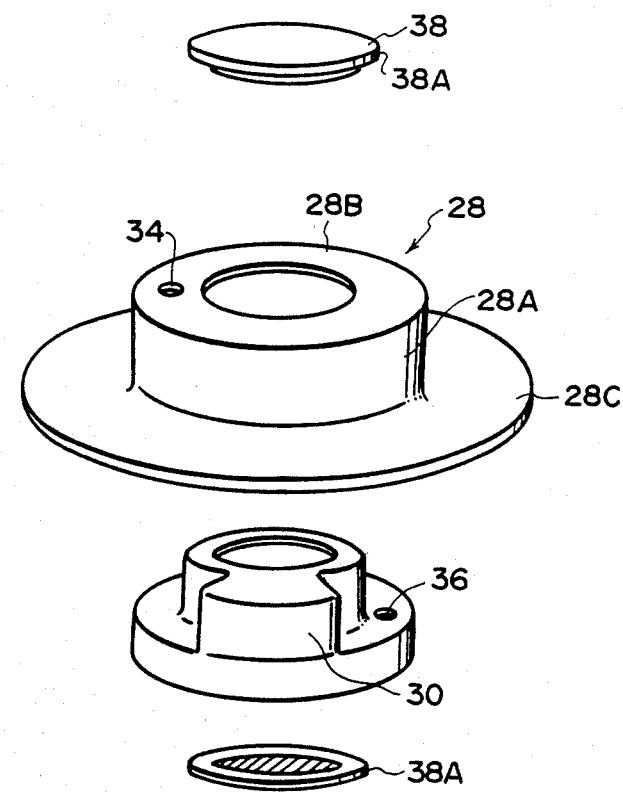
FIG. 3 an exploded perspective view of the partition and its associated elements.

A metal plate 40 is secured to the center of the diaphragm 14, the metal plate 40 facing the vibrating plate 38. The metal plate 40 is rigidly secured to a plunger 44 of a cylinder 42 which is, in turn, rigidly secured to the base plate 12, so that tee metal plate 40 is movable between two positions, that is, a first position where, as shown in FIG. 1, the metal plate 40 is spaced apart from the vibrating plate 38 to allow the latter to vibrate, and a second position where, as shown in FIG. 2, the metal plate 40 is brought into contact with the vibrating plate 38 by the operation of the cylinder 42 to fix the vibrating plate 38 on the partition 28 in order to prevent the plate 38 from vibrating.

The cylinder 42 is connected to a hydraulic pressure generating source 60 through a stop valve 62 controlled by a control means (microcomputer) 66 which is supplied with a signal from an engine frequency sensor 64.

The operation of this embodiment will be described below.

Vibrations of the engine are transmitted to the rubber member 18 through the top plate 20. Accordingly, the vibrations can be absorbed by means of the internal friction of the rubber member 18.

When the frequency of engine vibrations is relatively low, i.e., around 50 Hz, such low-frequency vibrations are absorbed by means of fluid resistance occurring when the liquid moves between the upper and lower small liquid chambers 24A and 24B through the orifice 32.

When the frequency of the engine vibration increases, the orifice 32 may be clogged or loaded with the liquid. In such case, however, the vibrating plate 38 vibrates in response to the high-frequency vibration. Thus, the high-frequency vibration can also be absorbed.

Vibrations of extremely low frequency, i.e., 20 to 30 Hz, such as those generated during idling of the engine can be absorbed by resonance of the liquid within the orifice 32. However, since the vibrating plate 38 is able to vibrate freely, it prevents the occurrence of resonance of the liquid within the orifice 32. Therefore, in this embodiment, the cylinder 42 is driven under the control of the control means 66 to move the metal plate 40 so as to fix the vibrating plate 38 on the partition 28 as shown in FIG. 2, thereby preventing the vibrating plate 38 from moving relative to the partition 28. Thus, the liquid within the orifice 32 is allowed to vibrate sympathetically, and it is possible to reliably absorb vibrations during idling of the engine. When the cylinder 42 is driven, the diaphragm 14 is deformed to allow deformation of the liquid chamber.

Since the cylinder 42 is disposed outside the liquid chamber, sealing of piping, wiring and the like is facilitated and ensured in contrast to the arrangement wherein the cylinder 42 is disposed inside the liquid chamber.

It should be noted that the cylinder 42 may be adapted to be actuated by a manual operation.

Figure 4:
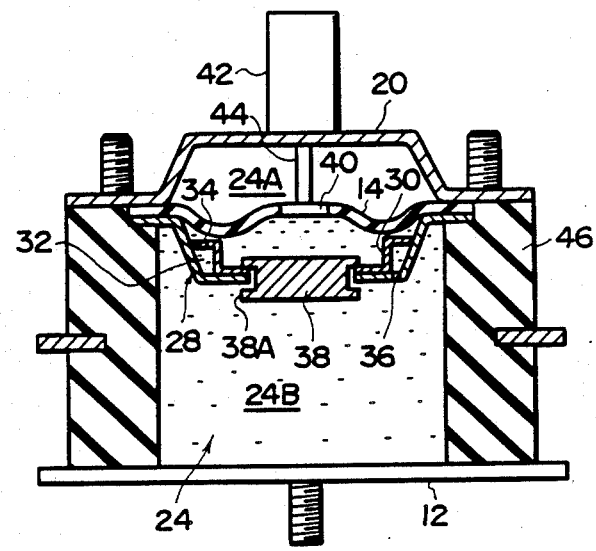
FIG. 4 is a sectional view of a second embodiment of the present invention.
Figure 5:
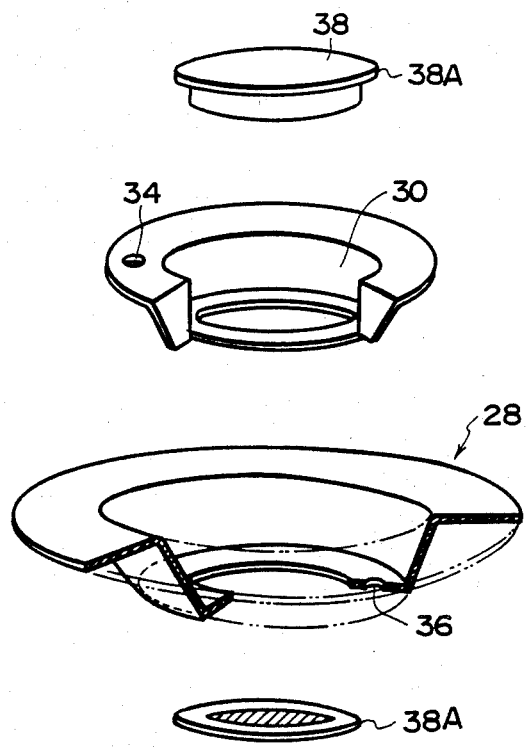
FIG. 5 is a partially-cutaway exploded perspective view of the partition and its associated elements employed in the second embodiment.

FIG. 4 shows a vibration isolating apparatus in accordance with a second embodiment of the present invention.

In this embodiment, a cylindrical rubber member 46 is rigidly secured to the base plate 12 and the respective outer peripheral portions of the diaphragm 14 and the top plate 20 are rigidly secured to the upper end portion of the cylindrical rubber member 46. Accordingly, the liquid chamber 24 in this embodiment is defined between the diaphragm 14, the cylindrical rubber member 46 and the base plate 12. This embodiment is similar to the first embodiment in that the liquid chamber 24 is divided by the partition 28 into the upper and lower small liquid chambers 24A and 24B, and the orifice 32 is defined between the partition 28 and the abutment plate 30, and further the vibrating plate 38 is provided in such a manner that it can be fixed by the operation of the cylinder 42.

It should be noted that the cylinder 42 employed in the present invention is not necessarily limitative and a drive source such as a motor or a solenoid may be employed in place of the cylinder 42.

As has been described above, the vibration isolating apparatus according to the present invention enables the vibrating plate to be fixed by the operation of the restraining means and therefore allows lowering of the dynamic scale factor during idling of the engine, advantageously.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A vibration isolating apparatus disposed between a vibration generating portion and a vibration receiving portion, comprising:
   (a) a liquid chamber capable of being expanded and contracted, said chamber being filled with a liquid;
   (b) a partition provided at an intermediate portion of said liquid chamber dividing said liquid chamber into a plurality of small liquid chambers;
   (c) an orifice provided in said partition for communicating between said small liquid chambers;
   (d) vibrating means provided on said partition in such a manner that said means is movable slightly in directions in which said small liquid chambers are expanded and contracted;
   (e) a flexibly membrane defining a part of a wall portion of said liquid chamber and being elastically deformable; and
   (f) restraining means for preventing said vibrating means from vibrating to ensure the occurrence of resonance of the liquid within said orifice in order to absorb low-frequency vibration when a vibration of extremely low frequency occurs on said vibration isolating apparatus.

2. A vibration isolating apparatus according to claim 1, wherein said restraining means is activated by driving force from driving means provided outside said liquid chamber so as to press said flexible membrane against said vibrating means, thereby pressing said vibrating means against said partition.

3. A vibration isolating apparatus according to claim 1, wherein said flexible membrane has a metal member secured to a part thereof, said metal member being pressed against said vibrating means.

4. A vibration isolating apparatus according to claim 1, wherein a portion of said vibrating means which extends into each small liquid chamber is enlarged in diameter to define an enlarged-diameter portion, so that said vibrating means is movable until said enlarged-diameter portion abuts against said partition, side restraining means causing said enlarged-diameter portion to be pressed against said partition in order to limit the movement of said vibrating means.

5. A vibration isolating apparatus according to claim 1, wherein said vibrating means is provided at an approximately central portion of said liquid chamber, said orifice being provided around said vibrating means.

6. A vibration isolating apparatus according to claim 5, wherein said restraining means is activated by driving force from driving means provided outside said liquid chamber so as to press said flexible membrane against said vibrating means, thereby pressing said vibrating means against said partition.

7. A vibration isolating apparatus according to claim 1, wherein a resilient member face one of said small liquid chambers, said resilient member being elastically deformed to increase the liquid pressure when a load from said vibration generating portion acts thereon, and the other small liquid chamber being provided with said flexible membrane which is elastically deformed in a direction in which said small liquid chamber is expanded in response to the increase in the liquid pressure.

8. A vibration isolating apparatus according to claim 1, wherein said restraining means has a cylinder supported by a member which defines a part of said liquid chamber, and a rod adapted to be pushed out from said cylinder in order to elastically deform said flexible membrane and thereby press said vibrating means together with said flexible membrane.

9. A vibration isolating apparatus according to claim 8, wherein said cylinder is supplied with hydraulic pressure through a valve which is opened when said low-frequency vibration occurs.

10. A vibration isolating apparatus according to claim 1, further comprising control means for controlling said restraining means in accordance with the vibration frequency.

11. A vibration isolating apparatus designed to absorb vibrations over a wide frequency range, comprising:
(a) a tubular member secured to either one of a vibration generating portion and a vibration receiving portion;
(b) a resilient member secured to one end of said tubular member;
(c) mounting means supported by said tubular member through said resilient member for mounting the other of said vibration generating and receiving portions;
(d) a flexible membrane secured to the other end of said tubular member to define a liquid chamber, said liquid chamber being filled with a liquid;
(e) a partition provided in said liquid chamber dividing said liquid chamber into a pair of small liquid chambers;
(f) an orifice provided in said partition for communicating between said pair of small liquid chambers;
(g) vibrating means mounted on said partition in such a manner that said vibrating means is movable by a very small amount; and
(h) restraining means having a rod extending outside said liquid chamber to press said vibrating means with a part of said flexible membrane when a low-frequency vibration occurs on said vibration isolating apparatus, for enabling resonance to readily occur within said orifice at the time of generation of a low-frequency vibration and thus effectively absorbing said vibration.

12. A vibration isolating apparatus according to claim 11, wherein said flexible membrane has a rigid member secured to a part thereof, said rigid member being pressed against said vibrating means.

13. A vibration isolating apparatus according to claim 12, wherein said rigid member is a metal.

14. A vibration isolating apparatus according to claim 11, wherein a portion of said vibrating menns which extends into each small liquid chamber is enlarged in diameter to define an enlarged-diameter portion, so that said vibrating means is movable until said enlarged-diameter portion abuts against said partition, said restraining means causing said enlarged-diameter portion to be pressed against said partition in order to limit the movement of said vibrating means.

15. A vibration isolating apparatus according to claim 11, wherein said orifice is provided around said vibrating means.

16. A vibration isolating apparatus according to claim 11, wherein said restraining means has a cylinder secured to said tubular member, and a rod driven by said cylinder and disposed in such a manner that its distal end opposes said flexible membrane.

17. A vibration isolating apparatus comprising:
(a) a tubular resilient member;
(b) a flexible membrane secured to the inside of said resilient member to define a liquid chamber filled with a liquid;
(c) a partition provided in said liquid chamber dividing said liquid chamber into a pair of small liquid chambers;
(d) an orifice provided in said partition for communicating between said small liquid chambers;
(e) vibrating means provided on said partition in such a manner that said vibrating means is movable by a very small amount; and
(f) restraining means disposed on said flexible membrane, and a plunger fixed to said restraining means and extending outward to press said vibrating means with a part of said flexible membrane when a low-frequency vibration occurs on said vibration isolating apparatus, thereby enabling resonance to readily occur within said orifice at the time of generation of a low-frequency vibration and thus effectively absorbing said vibration.

18. A vibration isolating apparatus according to claim 17, wherein said flexible membrane has a rigid member secured to a part thereof, said rigid member being pressed against said vibrating means.

19. A vibration isolating apparatus according to claim 17, wherein a portion of said vibrating means which extends into each small liquid chamber is enlarged in diameter to define an enlarged-diameter portion, so that said vibrating means is movable until said enlarged-diameter portion abuts against said partition, said restraining means causing said enlarged-diameter portion to be pressed against said partition in order to limit the movement of said vibrating means.

20. A vibration isolating apparatus according to claim 17, further comprising control means for controlling said restraining means in accordance with the vibration frequency.

* * * * *